Figure 1:
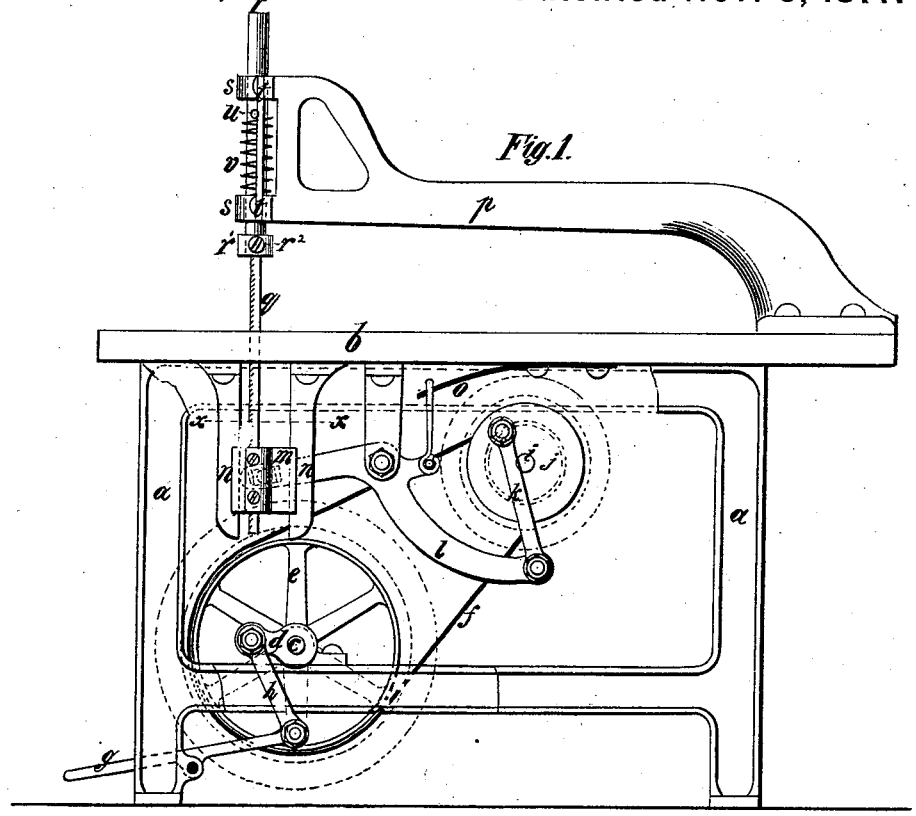

J. GLOVER,
Scroll Sawing Machine.

No. 196,796. Patented Nov. 6, 1877.

Witnesses:
Joseph Glover Jr.
Willis Baker

Inventor.
Joseph Glover
John Inglis atty

N. PETERS, PHOTO-LITHOGRAPHER, WASHINGTON, D.C.

UNITED STATES PATENT OFFICE.

JOSEPH GLOVER, OF PATERSON, NEW JERSEY.

IMPROVEMENT IN SCROLL-SAWING MACHINES.

Specification forming part of Letters Patent No. 196,796, dated November 6, 1877; application filed October 18, 1877.

*To all whom it may concern:*

Be it known that I, JOSEPH GLOVER, of the city of Paterson, county of Passaic and State of New Jersey, have invented a new and useful Improvement in Scroll-Sawing Machines, which improvement is fully set forth in the following specification, reference being had to the accompanying drawing.

My invention consists of a scroll-sawing machine of novel construction, combination, and arrangement of parts, and the object of which is to produce a machine simple in construction and effective in operation.

It consists of a frame made of iron or wood. There is journaled on this frame-work, near the bottom, a driving-shaft. On one end of this shaft there is a crank, which is connected by a connecting-rod to a treadle. This treadle is journaled in hangers secured to the sides of the frame. On this driving-shaft, near the crank end, there is a fly-wheel, the object of which is to give steadiness of motion to the shaft. On the other end, or near the end, there is a driving-pulley, which connects by a belt with a pulley on a counter-shaft, journaled in hangers bolted to the under side of the wooden table. On the end of this counter-shaft there is a disk. This disk connects with a lever pivoted on a hanger, bolted on the under side of the table by means of a connecting-rod. The front end of this lever is secured to a cross-head for holding the saw. This cross-head works in slides, which are secured to the table, the cross-head being constructed with flanges, which project and act as guides, keeping the cross-head in exact position when moving up and down on the slides. On one side of this cross-head there is a clamp for holding the saw. In this clamp are two steel set-screws for securing the saw to the cross-head. The end of the lever which is connected with the cross-head has in it a slot. In this slot works a die, made of brass or any other suitable metal, and is bolted to the cross-head. For ease, as well as steadiness of motion, this is far superior to a stud or carrying-roller, on account of its having more bearing-surface, and it is less liable to wear or get out of order. On the top side of the table there is an arm secured by screws or bolts. On the front end of this arm are guides, into which guides works a rod, for holding the upper end of the saw. On each side of this rod there is a slide, made of wrought-iron, secured to the end of the arm. These slides act as guides for a pin which runs through the rod, the object of which is to keep the rod from turning. On the lower end of this rod there is a brass collar, the object of which is to fasten the saw to the end of the rod. The rod has a slit in it, into which is inserted the end of the saw. In this collar there is a steel set-screw, which goes through the rod until it reaches the saw. There being no thread cut on the rod, the entire strain in fastening the saw by the set-screw falls on the collar. On this rod, between the guides, there is a spring, the lower end of which rests on the lower guide, while the upper end is kept under the pin in the rod, and which, from its position, acts promptly in distending the rod, and, being between the guides, cannot influence the rod from its perpendicular line. There is another spring arranged on the bottom side of the table, and is secured thereto, and which connects with the lever by means of an iron strap, which hooks on a pin in the end of a spur, arranged on the lever for that purpose. The object of this spring is to give additional promptness as well as power to the down motion of the saw.

The working of the treadle by the foot communicates motion to the driving-shaft by means of the connecting-rod, which connects with the crank end of the shaft at the crank. Motion is given to the counter-shaft by the belt which connects with the pulleys on both shafts. The lever is set in motion by being connected, by a connecting-rod, to the disk on the end of the counter-shaft. This lever, being pivoted on a hanger secured to the table, when in motion oscillates, and, being connected with the cross-head, gives motion thereto. The saw is secured to the cross-head, also to the rod above, which runs in guides on the end of the arm, by steel set-screws. The lever, thus oscillating, gives the up-and-down motion to the saw. There is a fly-wheel on the counter-shaft, the object of which is to equalize the motion of the same. The cross-head working longitudinally, and the guide-pin in the rod working against the slides, they keep absolute control of the saw, so that it cannot turn or move from its position when in use. The saw, being under this rigid control, cuts smoothly, and is not liable to break, being kept under an even tension.

Figure 2:
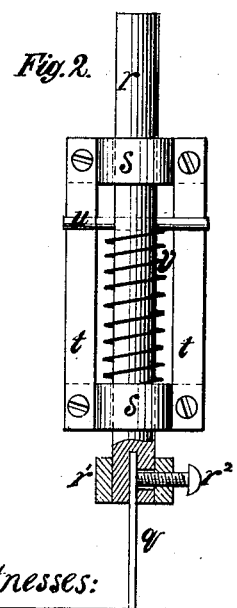
Figure 3:
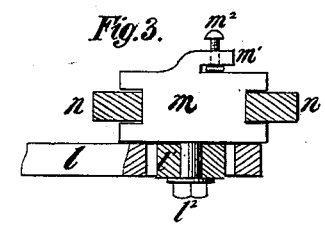
Figure 4:
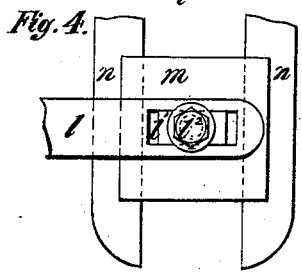

In the drawings, Figure 1 is a side elevation. Fig. 2 is a front view of the upper cross-head on a larger scale; Fig. 3, section of guides and plan of lower cross-head, taken on line $x\ x$; Fig. 4, side view of lower cross-head.

$a$ is the frame; $b$, the top or table; $c$, main shaft; $d$, crank; $e$, pulley; $f$, belt; $g$, treadle; $h$, connecting-rod; $i$, counter-shaft; $j$, disk; $k$, connecting-rod; $l$, lever; $m$, cross-head; $n\ n$, guides; $o$, balancing-spring; $p$, arm; $q$, saw; $r^1$, collar; $r$, rod; $r^2$, screw; $s\ s$, guides; $t\ t$, slides; $u$, pin; $v$, spring; $l^1$, die; $l^2$, bolt.

What I claim in a scroll-sawing machine is—

1. The combination of the die or adjustable box $l^1$, bolt $l^2$, lever $l$, secured to cross-head $m$, working in slides $n\ n$, with spring $o$, connecting-rod $k$, disk $j$, counter-shaft $i$, belt $f$, pulley $e$, driving-shaft $c$, crank $d$, connecting-rod $h$, treadle $g$, as described, and for the purpose shown and set forth.

2. In a scroll-sawing machine, the combination of the cross-head $m$, working longitudinally, and being supplied with clamp $m^1$, set-screw $m^2$, running in guides $n\ n$, with saw $q$, rod $r$, spring $v$, pin $u$, collar $r^1$, screw $r^2$, arm $p$, being supplied with guides $s\ s$, slides $t\ t$, as described, and for the purpose shown and set forth.

JOSEPH GLOVER.

Witnesses:
JOHN SANDFORD,
JOHN INGLIS.